(12) United States Patent  (10) Patent No.: US 8,313,866 B2
Ofer et al.  (45) Date of Patent: Nov. 20, 2012

(54) NON-AQUEOUS ELECTROLYTES AND ELECTROCHEMICAL DEVICES INCLUDING THE SAME

(75) Inventors: David Ofer, Needham, MA (US); Bookeun Oh, Burlington, MA (US)

(73) Assignee: Tiax LLC, Lexington, MA (US)

( * ) Notice: Subject to any disclaimer, the term of this patent is extended or adjusted under 35 U.S.C. 154(b) by 46 days.

(21) Appl. No.: 12/451,592

(22) PCT Filed: May 19, 2008

(86) PCT No.: PCT/US2008/064117
§ 371 (c)(1),
(2), (4) Date: Jul. 16, 2010

(87) PCT Pub. No.: WO2008/147751
PCT Pub. Date: Dec. 4, 2008

(65) Prior Publication Data
US 2010/0283429 A1    Nov. 11, 2010

Related U.S. Application Data

(60) Provisional application No. 60/931,266, filed on May 22, 2007.

(51) Int. Cl.
*H01M 6/18* (2006.01)
*H01M 4/13* (2010.01)

(52) U.S. Cl. .............. 429/321; 429/231.3; 429/322; 429/329; 429/330

(58) Field of Classification Search .............. 320/128; 429/321
See application file for complete search history.

(56) References Cited

U.S. PATENT DOCUMENTS

| 4,132,837 | A | 1/1979 | Soffer |
| 4,397,921 | A | 8/1983 | Xenzhek et al. |
| 4,609,600 | A | 9/1986 | Heinze et al. |
| 5,721,067 | A | 2/1998 | Jacobs et al. |
| 6,060,184 | A | 5/2000 | Gan et al. |
| 6,852,446 | B2 | 2/2005 | Barbarich |
| 2005/0019659 | A1* | 1/2005 | Shiozaki et al. .......... 429/231.3 |
| 2005/0084765 | A1 | 4/2005 | Lee |
| 2006/0204834 | A1 | 9/2006 | Kim |

* cited by examiner

*Primary Examiner* — M'Baye Diao
(74) *Attorney, Agent, or Firm* — Cantor Colburn LLP

(57) ABSTRACT

An electrochemical cell includes a cathode capable of reversibly releasing and receiving an alkali metal; an anode capable of reversibly releasing and receiving the alkali metal; and a non-aqueous electrolyte including one or more dissolved lithium salts, one or more nitriles, sulfur dioxide, and one or more other polar aprotic solvents. In some embodiments, the non-aqueous electrolyte is substantially free of one or more other polar aprotic solvents

39 Claims, 6 Drawing Sheets

NON-AQUEOUS ELECTROLYTES AND ELECTROCHEMICAL DEVICES INCLUDING THE SAME

CLAIM OF PRIORITY

This application claims priority to U.S. Provisional Application 60/931,266, filed on May 22, 2007, and entitled "Non-aqueous Electrolytes and Electrochemical Devices Including the Same", hereby incorporated by reference in its entirety.

FIELD OF THE INVENTION

The invention relates to non-aqueous electrolytes, electrochemical devices, such as lithium based secondary batteries, including the electrolytes, and related methods.

BACKGROUND

Lithium-ion (Li-ion) batteries are light weight, high energy, and long cycle life secondary (i.e., rechargeable) batteries. Lithium-ion batteries including non-aqueous electrolytes are being extensively used as power sources for portable electronic devices such as notebook personal computers, mobile phones, digital cameras, camcorders and so on. These lithium-ion batteries are also being evaluated as power sources for hybrid electric vehicles (HEV) and plug-in HEV (PHEV).

Lithium-ion batteries are typically prepared from one or more lithium-ion cells containing electrochemically active materials. A cell generally includes a pair of electrodes (i.e., an anode and a cathode) and a separator that electrically separates the electrodes, but allows ions to pass through it. An electrolyte is dispersed within the cell to maintain charge balance during charging and discharging. The electrolyte can include a lithium salt (e.g., $LiPF_6$) dissolved in one or more liquid solvents (such as aprotic organic solvents) or incorporated in one or more solid polymers (such as polyacrylonitrile). The anode of a lithium-ion cell typically includes an intercalation material. Examples of intercalation materials include carbonaceous materials, such as coke, mesocarbons (e.g., mesocarbon microbeads (MCMBs)), glassy carbons, amorphous carbon, and graphite. The cathode of a lithium-ion cell typically includes a lithium metal oxide, such as $LiCoO_2$, $LiNiO_2$, or $LiMn_2O_4$.

A lithium-ion cell typically is not charged in its initial condition. To deliver energy, such a cell is typically charged so lithium ions are released from the lithium-containing cathode, transferred to the anode, and intercalated at the anode. During discharge, a reverse process occurs to deliver an electrical current through an external load. Upon subsequent charge and discharge, the lithium ions are transported between the anode and cathode.

SUMMARY

In one aspect, the invention features non-aqueous electrolytes, electrochemical devices, such as lithium based secondary batteries, including the electrolytes, and related methods. In some embodiments, the electrolytes are prepared by dissolving one or more lithium salts in a mixture including one or more nitriles, sulfur dioxide ($SO_2$), and one or more other polar aprotic solvents, such as, for example, carbonates, lactones, ethers, esters, and/or acetates. In other embodiments, the electrolytes are substantially free of the one or more other polar aprotic solvents.

In another aspect, the invention features an electrochemical cell including a cathode that is capable of having an alkali metal reversibly inserted into and de-inserted from the cathode; an anode capable of reversibly releasing and receiving the alkali metal; and a non-aqueous electrolyte including one or more dissolved lithium salts, one or more nitriles, sulfur dioxide, and one or more other polar aprotic solvents.

Embodiments may include one or more of the following features. The concentration of the one or more dissolved lithium salts in the electrolyte is from about 0.3M to about 2.0M. The one or more dissolved lithium salts includes $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, lithium bis(oxalato)borate (LiBOB), halogenated LiBOB, a polyvalent anionic lithium salt, $Li_2B_{12}F_xH_{12-x}$, or mixtures thereof. The concentration of the one or more nitriles is from about 5 vol % to about 100 vol %. The one or more nitriles includes aliphatic nitriles, aromatic nitriles, alicyclic nitriles, acetonitrile, propionitrile, butyronitrile, valeronitrile, hexanenitrile or mixtures thereof. The concentration of the one or more other polar aprotic solvents is from about 0 vol % to about 95 vol %. The one or more other polar aprotic solvents includes carbonate, lactone, ether, ester, acetate, or mixtures thereof. The carbonate includes ethylene carbonate, propylene carbonate, butylene carbonate, fluoroethylene carbonate, vinylene carbonate, dimethylvinylene carbonate, vinylethylene carbonate, dimethyl carbonate, ethyl methyl carbonate, diethyl carbonate, methyl propyl carbonate, dipropyl carbonate, methyl butyl carbonate, dibutyl carbonate or mixtures thereof. The alkali metal includes lithium. The cathode includes $LiCoO_2$, $LiNiO_2$, $LiNi_xCo_yM_zO_2$, wherein M is one of metal element selected from the group consisting of Al, Mg, Ti, B, Ga and Si, and $0.0 \leq x, y, z \leq 1$ and $x+y+z=1$, $LiMn_{0.5}Ni_{0.5}O_2$, $LiNi_{1/3}Co_{1/3}Mn_{1/3}O_2$, $LiFePO_4$, $LiCoPO_4$, $LiMnPO_4$, $LiMn_2O_4$, vanadium oxide, or mixtures thereof. The anode includes graphite, carbon, $Li_4Ti_5O_{12}$, tin alloys, silicon alloys, intermetallic compounds, lithium metal, or mixtures thereof.

In another aspect, the invention features a method including forming a non-aqueous electrolyte including one or more dissolved lithium salts, one or more nitriles, sulfur dioxide, and one or more other polar aprotic solvents; and using the electrolyte to make an electrochemical cell.

Embodiments may include one or more of the following features. The concentration of the one or more dissolved lithium salts in the electrolyte is from about 0.3M to about 2.0M. The one or more dissolved lithium salts includes $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlCl_4$, lithium bis(oxalato)borate (LiBOB), halogenated LiBOB, a polyvalent anionic lithium salt, $Li_2B_{12}F_xH_{12-x}$, or mixtures thereof. The concentration of the one or more nitriles is from about 5 vol % to about 100 vol %. The one or more nitriles includes aliphatic nitriles, aromatic nitriles, alicyclic nitriles, acetonitrile, propionitrile, butyronitrile, valeronitrile, hexanenitrile or mixtures thereof. The concentration of the one or more other polar aprotic solvents is from about 0 vol % to about 95 vol %. The one or more other polar aprotic solvents includes carbonate, lactone, ether, ester, acetate, and mixtures thereof. The carbonate includes ethylene carbonate, propylene carbonate, butylene carbonate, fluoroethylene carbonate, vinylene carbonate, dimethylvinylene carbonate, vinylethylene carbonate, dimethyl carbonate, ethyl methyl carbonate, diethyl carbonate, methyl propyl carbonate, dipropyl carbonate, methyl butyl carbonate, dibutyl carbonate or mixtures thereof. The cell includes lithium capable of being reversibly released from and received by an anode, and capable of being reversibly de-inserted from and inserted into a cathode. The cell includes a cathode having a material including $LiCoO_2$, $LiNiO_2$, $LiNi_xCo_yM_zO_2$, wherein M is one of metal element selected from the group consisting of Al, Mg, Ti, B, Ga and Si, and $0.0 \leq x$, y, $z \leq 1$ and $x+y+z=1$, $LiMn_{0.5}Ni_{0.5}O_2$, $LiNi_{1/3}Co_{1/3}Mn_{1/3}O_2$, $LiFePO_4$, $LiCoPO_4$, $LiMnPO_4$, $LiMn_2O_4$, vanadium oxide, or mixtures thereof. The cell includes an anode having a material including graphite, carbon, $Li_4Ti_5O_{12}$, tin alloys, silicon alloys, intermetallic compounds, lithium metal, or mixtures thereof.

In another aspect, the invention features an electrochemical cell including a cathode that is capable of having an alkali metal reversibly inserted into and de-inserted from the cathode; an anode capable of reversibly releasing and receiving the alkali metal; and a non-aqueous electrolyte consisting essentially of one or more dissolved lithium salts, one or more nitriles, and sulfur dioxide.

Embodiments may include one or more of the following features. The concentration of the one or more dissolved lithium salts in the electrolyte is from about 0.3M to about 2.0M. The one or more dissolved lithium salts includes $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlCl_4$, $LiSO_3CF_3$, lithium bis(oxalato)borate (LiBOB), halogenated LiBOB, a polyvalent anionic lithium salt, $Li_2B_{12}F_xH_{12-x}$, or mixtures thereof. The concentration of the one or more nitriles is from about 30 vol % to about 99.5 vol %. The one or more nitriles includes aliphatic nitriles, aromatic nitriles, alicyclic nitriles, acetonitrile, propionitrile, butyronitrile, valeronitrile, hexanenitrile and mixtures thereof. The alkali metal includes lithium. The cathode includes $LiCoO_2$, $LiNiO_2$, $LiNi_xCo_yM_zO_2$, wherein M is one of metal element selected from the group consisting of Al, Mg, Ti, B, Ga and Si, and $0.0 \leq x$, y, $z \leq 1$ and $x+y+z=1$, $LiMn_{0.5}Ni_{0.5}O_2$, $LiNi_{1/3}Co_{1/3}Mn_{1/3}O_2$, $LiFePO_4$, $LiCoPO_4$, $LiMnPO_4$, $LiMn_2O_4$, vanadium oxide, or mixtures thereof. The anode includes graphite, carbon, $Li_4Ti_5O_{12}$, tin alloys, silicon alloys, intermetallic compounds, lithium metal, or mixtures thereof. The electrolyte is substantially free of other polar aprotic solvents.

In another aspect, the invention features a method including charging the electrochemical cell as described herein prior to an initial discharge; initially discharging the cell; and recharging the cell after initially discharging the cell.

Embodiments may include one or more of the following advantages.

The electrolytes are capable of providing good low temperature cell performance and high temperature cell life over an extended temperature range, such as from about −40° C. to about 70° C.

The electrochemical cells can be used in portable electronic devices, HEV, PHEV and military applications.

An electrochemical cell can be a primary cell or a secondary cell. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

The details of one or more embodiments are set forth in the accompanying description below. Other aspects, features, and advantages of the invention will be apparent from the following drawings, detailed description of embodiments, and also from the appending claims.

DETAILED DESCRIPTION

Figure 1:
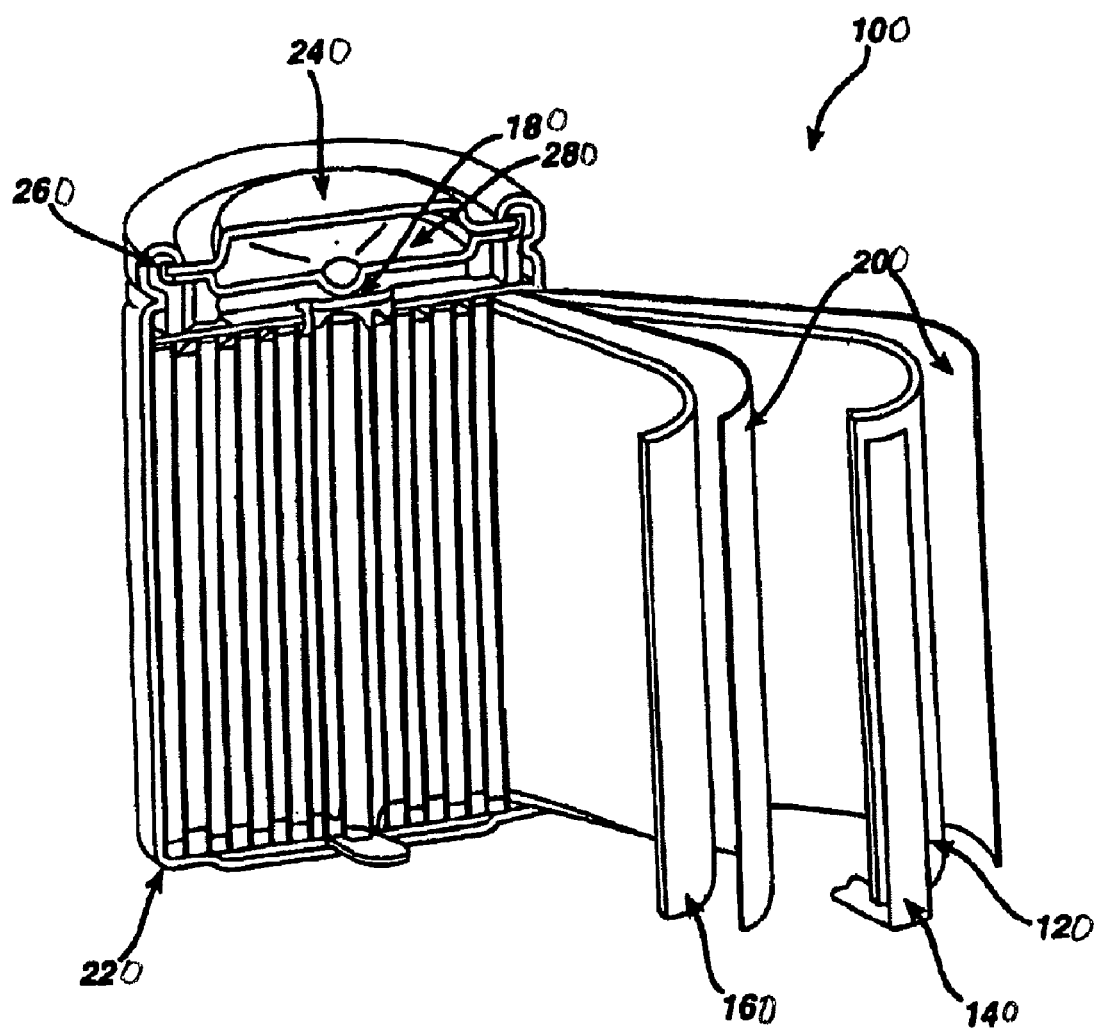
FIG. 1 is an illustration of an embodiment of a lithium-ion electrochemical cell.

Referring to FIG. 1, a lithium-ion electrochemical cell 100 includes an anode 120 in electrical contact with a negative current collector 140, a cathode 160 in electrical contact with a positive current collector 180, a separator 200, and an electrolyte. Anode 120, cathode 160, separator 200, and the electrolyte are contained within a case 220 to maintain charge balance.

The electrolyte includes one or more lithium salts dissolved in a solvent including one or more nitriles, one or more aprotic solvents, and sulfur dioxide ($SO_2$). Without being bound by theory, it is believed that a nitrile-containing solvent can provide a low viscosity, a low melting point, a high dielectric constant, and high oxidation resistance, e.g., relative to some linear esters. However, in some applications, nitriles do not form a stable solid electrolyte interface (SEI) passivating layer on the surface of carbonaceous or lithium metal anodes, and therefore when used with such low potential anodes, nitrile solvents tend to undergo continued electrochemical reduction, resulting in poor cell life. Thus, nitrile solvents are used together with other electrolyte components that can form stable SEI layers on the surface of carbon, lithium metal or other low-potential anodes. Furthermore, it is believed that $SO_2$, which has a reduction potential that is more positive than a reduction potential of certain nitriles, can serve as solid electrolyte interface (SEI)-forming additive that can be preferentially reduced. By using $SO_2$ (an SEI former) in combination with one or more nitriles, the concentration of nitrile(s) in the electrolyte can be increased (e.g., to greater than about 30 vol %) to enhance (e.g., maximize) the desirable properties that the nitrile(s) can provide. For example, by using a low melting point, low viscosity, high conductivity and high stability electrolyte with an anode SEI having outstanding low temperature performance characteristics, the electrolyte can provide excellent performance at low temperatures and outstanding high temperature stability. In some embodiments, an electrolyte including $SO_2$ and one or more nitriles provides equal to or greater than approximately 1 mS/cm of conductivity at −40° C. and reduced electrolyte decomposition at 85° C., for example, compared to commonly used electrolytes formulated with only carbonate solvents.

In some embodiments, a solvent composition for the electrolyte includes from about 70 wt % to about 99.95 wt % of a solvent mixture having (i) from about 5 vol % to about 100 vol % of one or more nitriles, (ii) from about 0 vol % to about 95 vol % of one or more other polar aprotic solvents, and (iii) from about 0.05 wt % to about 30 wt % of $SO_2$. For example, a solvent composition for the electrolyte can include from about 90 wt % to about 99.5 wt % of a solvent mixture having (i) from about 10 vol % to about 80 vol % of one or more nitriles, (ii) from about 20 vol % to about 90 vol % of one or more other polar aprotic solvents, and (iii) from about 0.5 wt % to about 10 wt % of $SO_2$. As another example, a solvent composition for the electrolyte can include from about 95 wt % to about 99 wt % of a solvent mixture having (i) from about 30 vol % to about 60 vol % of one or more nitriles, (ii) from about 40 vol % to about 70 vol % of one or more other polar aprotic solvents, and (iii) from about 1 wt % to about 5 wt % of $SO_2$.

The lithium salt can be any material that dissolves in the solvent(s) and provides ions, thereby forming an electrolyte. Examples of specific lithium salts that provide lithium ions include: $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlCl_4$, lithium bis(oxalato)borate (LiBOB), halogenated LiBOB, polyvalent anionic lithium salts such as $Li_2B_{12}F_xH_{12-x}$, and mixtures thereof in any combination.

The concentration of the lithium salt(s) can range from about 0.3M to about 2.0M, for example, from about 0.5M to about 1.5M, and from about 0.6M to about 1.3M. The concentration of lithium salt(s) can be equal to or greater than about 0.3M, equal to or greater than about 0.5M, equal to or greater than about 0.7M, equal to or greater than about 0.9M, equal to or greater than about 1.1M, equal to or greater than about 1.3M, equal to or greater than about 1.5M, equal to or greater than about 1.7M, equal to or greater than about 1.9M; and/or equal to or less than about 2.0M, equal to or less than about 1.8M, equal to or less than about 1.6M, equal to or less than about 1.4M, equal to or less than about 1.2M, equal to or less than about 1.0M, equal to or less than about 0.8M, equal to or less than about 0.6M, or equal to or less than about 0.4M.

As indicated above, it is believed that a nitrile-containing solvent can provide a low viscosity, a low melting point, a high dielectric constant, high oxidation resistance, and high anodic stability for enhanced low temperature performance and high temperature life. Examples of nitriles include aliphatic nitriles, aromatic nitriles and alicyclic nitriles, such as propionitrile, butyronitrile, valeronitrile, and hexanenitrile as listed in Table 1.

TABLE 1

Physical properties of some nitriles

| Solvent | Abbreviation | Molecular Formula | Bp (° C.) | Mp (° C.) | Dielectric constant |
|---|---|---|---|---|---|
| Propionitrile | PN | $CH_3CH_2CN$ | 97 | −93 | 27.7 |
| Butyronitrile | BN | $CH_3CH_2CH_2CN$ | 116 | −112 | 20.7 |

TABLE 1-continued

Physical properties of some nitriles

| Solvent | Abbreviation | Molecular Formula | Bp (° C.) | Mp (° C.) | Dielectric constant |
|---|---|---|---|---|---|
| Valeronitrile | VN | $CH_3(CH_2)_3CN$ | 140 | −96 | 17.7 |
| Hexanenitrile | HN | $CH_3(CH_2)_4CN$ | 162 | −80 | N/A |

The electrolyte can include from about 5 vol % to about 100 vol % of one or more nitriles. For example, the electrolyte can include equal to or greater than about 5 vol %, equal to or greater than about 10 vol %, equal to or greater than about 15 vol %, equal to or greater than about 20 vol %, equal to or greater than about 25 vol %, equal to or greater than about 30 vol %, equal to or greater than about 35 vol %, equal to or greater than about 40 vol %, equal to or greater than about 45 vol %, equal to or greater than about 50 vol %, equal to or greater than about 55 vol %, equal to or greater than about 60 vol %, equal to or greater than about 65 vol %, equal to or greater than about 70 vol %, equal to or greater than about 75 vol %, equal to or greater than about 80 vol %, equal to or greater than about 85 vol %, equal to or greater than about 90 vol %, or equal to or greater than about 95 vol % of one or more other polar aprotic solvents; and/or the electrolyte can include equal to or less than about 100 vol %, equal to or less than about 95 vol %, equal to or less than about 90 vol %, equal to or less than about 85 vol %, equal to or less than about 80 vol %, equal to or less than about 75 vol %, equal to or less than about 70 vol %, equal to or less than about 65 vol %, equal to or less than about 60 vol %, equal to or less than about 55 vol %, equal to or less than about 50 vol %, equal to or less than about 45 vol %, equal to or less than about 40 vol %, equal to or less than about 35 vol %, equal to or less than about 30 vol %, equal to or less than about 25 vol %, equal to or less than about 20 vol %, equal to or less than about 15 vol %, or equal to or less than about 10 vol % of one or more other polar aprotic solvents.

Examples of other polar aprotic solvents include carbonates, such as ethylene carbonate (EC), propylene carbonate (PC), butylene carbonate, fluoroethylene carbonate (FEC), vinylene carbonate (VC), dimethylvinylene carbonate, vinylethylene carbonate, dimethyl carbonate (DMC), ethyl methyl carbonate (EMC), diethyl carbonate (DEC), methyl propyl carbonate, dipropyl carbonate, methyl butyl carbonate, dibutyl carbonate and the like; lactones, such as γ-butyrolactone (GBL), γ-valerolactone, γ-caprolactone and the like; ethers, such as tetrahydrofuran (THF), 2-methyltetrahydrofuran, 1,4-dioxane, 1,2-dimethoxyethane (DME), 1,2-diethoxyethane, 1,2-dibutoxyethane and the like; esters, such as methyl propionate, methyl pivalate, butyl pivalate, hexyl pivalate, octyl pivalate, dimethyl oxalate, ethyl methyl oxalate, diethyl oxalate and the like; and/or acetates, such as methyl acetate (MA), ethyl acetate (EA), propyl acetate, butyl acetate and the like.

The electrolyte can include from about 20 vol % to about 90 vol % of one or more other polar aprotic solvents. For example, the electrolyte can include equal to or greater than about 20 vol %, equal to or greater than about 25 vol %, equal to or greater than about 30 vol %, equal to or greater than about 35 vol %, equal to or greater than about 40 vol %, equal to or greater than about 45 vol %, equal to or greater than about 50 vol %, equal to or greater than about 55 vol %, equal to or greater than about 60 vol %, equal to or greater than about 65 vol %, equal to or greater than about 70 vol %, equal to or greater than about 75 vol %, equal to or greater than about 80 vol %, or equal to or greater than about 85 vol % of one or more other polar aprotic solvents; and/or the electrolyte can include equal to or less than about 90 vol %, equal to or less than about 85 vol %, equal to or less than about 80 vol %, equal to or less than about 75 vol %, equal to or less than about 70 vol %, equal to or less than about 65 vol %, equal to or less than about 60 vol %, equal to or less than about 55 vol %, equal to or less than about 50 vol %, equal to or less than about 45 vol %, equal to or less than about 40 vol %, equal to or less than about 35 vol %, equal to or less than about 30 vol %, or equal to or less than about 25 vol % of one or more other polar aprotic solvents.

Without being bound to theory, it is believed that the sulfur dioxide can form a highly stable anode-passivating film, sometimes called a solid electrolyte interface (SEI) that enhances a cell's low temperature performance and high temperature life. The sulfur dioxide can allow the use of low ethylene carbonate-content solvent compositions that contain high dielectric constant, low viscosity solvents that may be poor SEI-formers.

The electrolyte can include from about 0.05 wt % to about 30 wt % of $SO_2$. For example, the electrolyte can include equal to or greater than about 0.05 wt %, equal to or greater than about 5 wt %, equal to or greater than about 10 wt %, equal to or greater than about 15 wt %, equal to or greater than about 20 wt %, or equal to or greater than about 25 wt % of $SO_2$; and/or equal to or less than about 30 wt %, equal to or less than about 25 wt %, equal to or less than about 20 wt %, equal to or less than about 15 wt %, equal to or less than about 10 wt %, or equal to or less than about 5 wt % of $SO_2$.

Cathode 160 can any material capable of reversibly releasing lithium ions during the charging process and reversibly receiving (e.g., by insertion/de-insertion or intercalation/deintercalation) these ions during the discharging process of a lithium-ion cell. Examples of materials that can be included in cathode 160 are layered type lithium metal oxides, such as $LiCoO_2$, $LiNiO_2$, $LiNi_xCo_yM_zO_2$ (wherein M is a metal selected from Al, Mg, Ti, B, Ga and Si; and $0.0 \leq x, y, z \leq 1$ and $x+y+z=1$), $LiMn_{0.5}Ni_{0.5}O_2$ and $LiNi_{1/3}Co_{1/3}Mn_{1/3}O_2$; olivine type materials, such as $LiFePO_4$, $LiCoPO_4$ and $LiMnPO_4$; spinel-type materials, such as $LiMn_2O_4$ and $LiNi_{0.5}Mn_{1.5}O_4$; vanadium oxide; and mixtures of any two or more thereof.

Anode 120 can include any material capable of reversibly receiving lithium ions during the charging process and reversibly releasing (e.g., by insertion/de-insertion or intercalation/deintercalation) these ions during the discharging process of a Li ion battery. Examples of materials that can be included in anode 120 are graphites, carbons, $Li_4Ti_5O_{12}$, tin alloys, silicon alloys, intermetallic compounds, lithium metal, lithium alloys, and mixtures of any two or more thereof.

Separator 200 can include any material capable of providing electrical isolation between cathode 160 and anode 120, while allowing ions to pass through the separator. Examples of materials that can be included in separator 200 include microporous single layer of polyethylene (PE), microporous single layer of polypropylene (PP), microporous PP/PE/PP tri-layer separator, and polyolefin/inorganic hybrid microporous separator.

While a number of embodiments have been described, the invention is not so limited.

For example, in some embodiments, the electrolyte includes (e.g., consists of or consists essentially of) one or more lithium salts dissolved in a solvent including one or more nitriles and sulfur dioxide ($SO_2$), and is substantially free (e.g., less than 5 vol %) of any other aprotic solvent). These electrolyte compositions can expand the applicable temperature and voltage range of a lithium rechargeable battery due to the nitriles' exceptional lithium ion conductivity at low temperature, stability at high temperature, and stability at very positive anodic electrochemical potential. The lithium salt(s) and nitrile(s) can be selected from the materials disclosed above.

The concentration of the lithium salt(s) can range from about 0.3M to about 2M, for example, from about 0.5M to about 1.5M, and from about 0.7M to about 1.2M. The concentration of lithium salt(s) can be equal to or greater than about 0.3M, equal to or greater than about 0.5M, equal to or greater than about 0.7M, equal to or greater than about 0.9M, equal to or greater than about 1.1M, equal to or greater than about 1.3M, equal to or greater than about 1.5M, equal to or greater than about 1.7M, equal to or greater than about 1.9M; and/or equal to or less than about 2.0M, equal to or less than about 1.8M, equal to or less than about 1.6M, equal to or less than about 1.4M, equal to or less than about 1.2M, equal to or less than about 1.0M, equal to or less than about 0.8M, equal to or less than about 0.6M, or equal to or less than about 0.4M.

The electrolyte can include from about 30 vol % to about 99.5 vol % of one or more nitriles. For example, the electrolyte can include equal to or greater than about 30 vol %, equal to or greater than about 35 vol %, equal to or greater than about 40 vol %, equal to or greater than about 45 vol %, equal to or greater than about 50 vol %, equal to or greater than about 55 vol %, equal to or greater than about 60 vol %, equal to or greater than about 65 vol %, equal to or greater than about 70 vol %, equal to or greater than about 75 vol %, equal to or greater than about 80 vol %, equal to or greater than about 85 vol %, equal to or greater than about 90 vol %, or equal to or greater than about 95 vol % of one or more nitriles; and/or the electrolyte can include equal to or less than about 99.5 vol %, equal to or less than about 95 vol %, equal to or less than about 90 vol %, equal to or less than about 85 vol %, equal to or less than about 80 vol %, equal to or less than about 75 vol %, equal to or less than about 70 vol %, equal to or less than about 65 vol %, equal to or less than about 60 vol %, equal to or less than about 55 vol %, equal to or less than about 50 vol %, equal to or less than about 45 vol %, equal to or less than about 40 vol %, or equal to or less than about 35 vol % of one or more nitriles.

The electrolyte can include from about 0.05 wt % to about 30 wt % of $SO_2$. For example, the electrolyte can include equal to or greater than about 0.05 wt %, equal to or greater than about 5 wt %, equal to or greater than about 10 wt %, equal to or greater than about 15 wt %, equal to or greater than about 20 wt %, or equal to or greater than about 25 wt % of $SO_2$; and/or equal to or less than about 30 wt %, equal to or less than about 25 wt %, equal to or less than about 20 wt %, equal to or less than about 15 wt %, equal to or less than about 10 wt %, or equal to or less than about 5 wt % of $SO_2$.

The following Examples and Comparative Examples, in particular, the formulations of solvents and salts, are illustrative and not limiting.

EXAMPLES AND COMPARATIVE EXAMPLES

A series of electrolyte formulations were prepared to evaluate their electrochemical characteristics with some Comparative Examples. All electrolyte formulations were prepared in an argon-filled glove box except Comparative Example 1 which was purchased from Kishida Chemical Co. (Japan). To measure the ionic conductivity of the electrolyte formulations, 2016 size coin cells having stainless steel electrodes were constructed with the electrolyte formulations. Electrochemical impedance spectroscopy (EIS) measurements using an EG&G PAR Model 273A potentiostat/galvanostat with a Model SI 1260 Impedance/Gain-Phase Analyzer were performed on these cells to measure bulk resistance of the electrolyte formulations. The ac-impedance was measured from room temperature to −40° C. with 5 mV amplitude. Low-temperature measurements were performed in a ScienTemp freezer having feed-through cables to the impedance analyzer. The ionic conductivity of the electrolyte formulations was calculated using the following equation (1):

$$\text{Ionic conductivity }(\sigma)=L/(A \times R)(S/\text{cm}) \quad (1)$$

where L is the length between two electrodes, A is the effective measurement area, and R is the bulk resistance obtained from an EIS measurement.

Examples 1-4

$LiPF_6$ salt was dissolved in valeronitrile (VN) in various molar concentrations as listed in TABLE 2. VN improved ionic conductivity at low temperature relative to COMPARATIVE EXAMPLE 1 ("COMP. EX. 1"), 1M $LiPF_6$ in EC/DMC/EMC (1/1/1 vol %) (EDE111). VN electrolytes with low molar concentration showed higher conductivity at low temperatures. 1M $LiPF_6$ in BN showed higher conductivity across the temperature range.

TABLE 2

| | | T (° C.) | | | | | | |
|---|---|---|---|---|---|---|---|---|
| | | 23 | 10 | 0 | −10 | −20 | −30 | −40 |
| Sample | Formulation | Conductivity (mS/cm) | | | | | | |
| EXAMPLE 1 | 1.0M $LiPF_6$ in VN | 10.38 | 8.87 | 7.11 | 5.62 | 4.35 | 3.29 | 2.10 |
| EXAMPLE 2 | 0.8M $LiPF_6$ in VN | 11.00 | 9.07 | 7.43 | 6.06 | 4.89 | 3.75 | 2.49 |
| EXAMPLE 3 | 0.5M $LiPF_6$ in VN | 9.28 | 7.90 | 6.77 | 5.74 | 4.85 | 3.84 | 2.78 |
| EXAMPLE 4 | 1.0M $LiPF_6$ in BN | 19.30 | 16.00 | 14.19 | 11.85 | 9.68 | 7.86 | 5.56 |
| COMP. EX. 1 | 1M $LiPF_6$ in EDE111 | 10.30 | 8.09 | 6.33 | 4.88 | 3.70 | 2.47 | 1.39 |

Examples 5-8

LiBOB salt was dissolved in mixtures of nitrites and carbonates in various molar concentrations as listed in TABLE 3. The two carbonate mixtures used were EDE111 and EC/PC/DMC (1/1/3 by vol %) (EPD113). The table shows that the addition of either $SO_2$ or nitriles improved the low temperature conductivity of COMPARATIVE EXAMPLE 2 ("COMP. EX. 2"), 0.7M LiBOB in EPD113. In keeping with the trend observed for $LiPF_6$-based electrolyte formulations as mentioned in EXAMPLES 1-5, BN addition to LiBOB/carbonate-based electrolyte formulation provided higher conductivity than did VN addition.

Examples 9-12

The following electrolyte formulations were prepared for further electrochemical evaluation as listed in TABLE 4.

TABLE 4

| Sample | Li salt | [Mol] | Solvent System | Abbrev. |
|---|---|---|---|---|
| EXAMPLE 9 | $LiPF_6$ | 1 | EC/DMC/EMC/BN (1/1/1/3 by vol %) + 1 wt % $SO_2$ | EDEBS1 |
| EXAMPLE 10 | $LiPF_6$ | 1 | EC/DMC/EMC/BN (1/1/1/3 by vol %) + 5 wt % $SO_2$ | EDEBS5 |
| EXAMPLE 11 | LiBOB | 0.6 | EC/PC/DMC/BN (1/1/1/3 by vol %) + 1 wt % $SO_2$ | EPDBS1 |
| EXAMPLE 12 | LiBOB | 0.6 | EC/PC/DMC/BN (1/1/1/3 by vol %) + 5 wt % $SO_2$ | EPDBS5 |

Anode electrodes were prepared follows. Osaka Gas MCMB 2528 graphite was coated on Cu foil at a coverage of about 5 mg/cm$^2$ (single-sided coating) using an electrode slurry formulation with solids content of 90% active material, 3% Denka AB acetylene black, and 7% polyvinylidene fluoride (PVDF) binder in N-methyl pyrrolidone (NMP) solvent. The slurry was made by dispersing and mixing MCMB and AB into the NMP solution of PVDF. The slurry was applied to the electrode current collector foil using a thin-film drawdown table, and the coated foil was dried at 130° C. for 30 min, and finally the dried electrode was calendered to the desired thickness and porosity. The porosity was between 30 and 40%, translating to an electrode coating density of between 1.35 and 1.45 g/cc. Lithium-ion anode half cells were built using 2016 size coin cell with the electrolyte formulations of EXAMPLES 9 and 10 as well as with COMP. EX. 1 to evaluate 1$^{st}$ cycle efficiency and to measure ac impedance (EIS) at −40° C.

Figure 2:
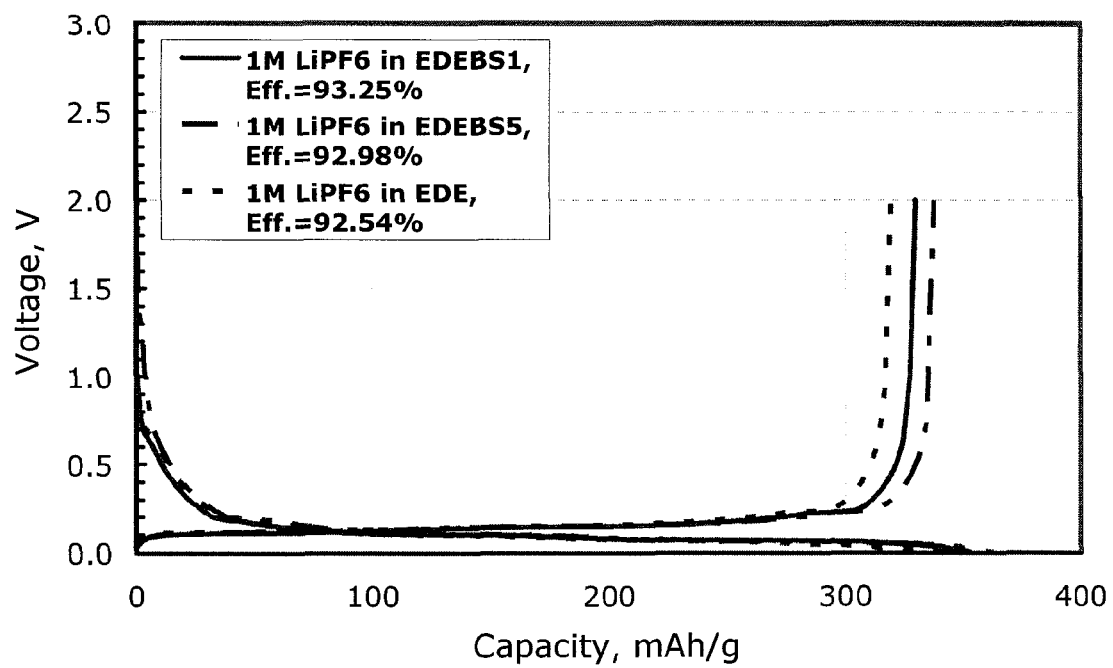
FIG. 2 is a graph showing C/20 formation cycles of lithium-ion meso-carbon micro-bead (MCMB) anode half cells with electrolyte formulations described in EXAMPLES 9 and 10, and an electrolyte described in COMPARATIVE EXAMPLE 1. The efficiency was obtained from an average of two cells.

FIG. 2 shows the C/20 1$^{st}$ lithiation/delithiation cycle for the lithium ion anode half cells. The lithium ion anode half

TABLE 3

| | | T (° C.) | | | | | | |
|---|---|---|---|---|---|---|---|---|
| | | 24 | 10 | 0 | −10 | −20 | −30 | −40 |
| Sample | Formulation | Conductivity (mS/cm) | | | | | | |
| EXAMPLE 5 | 0.6M LiBOB in EPD113/VN (50/50 by vol %) | 7.15 | 5.34 | 4.14 | 3.24 | 2.29 | 1.56 | 0.78 |
| EXAMPLE 6 | 0.6M LiBOB in EPD113/BN (50/50 by vol %) | 8.79 | 6.57 | 5.28 | 4.20 | 3.04 | 2.14 | 1.24 |
| EXAMPLE 7 | 0.7M LiBOB in EPD113/$SO_2$ (27.2 wt % $SO_2$) | 8.57 | 6.37 | 5.08 | 3.98 | 2.79 | 1.93 | 0.69 |
| EXAMPLE 8 | 0.7M LiBOB in EDE111/$SO_2$ (20.4 wt % $SO_2$) | 7.41 | 5.59 | 4.50 | 3.51 | 2.52 | 1.75 | 0.97 |
| COMP. EX. 2 | 0.7M LiBOB in EPD113 | 5.76 | 4.18 | 3.23 | 2.28 | 1.21 | 0.68 | 0.38 | cells with electrolyte formulations of EXAMPLES 9 and 10 had 1st cycle efficiencies better than those of a lithium-ion cell with the electrolyte of COMP. EX. 1.

Figure 3:
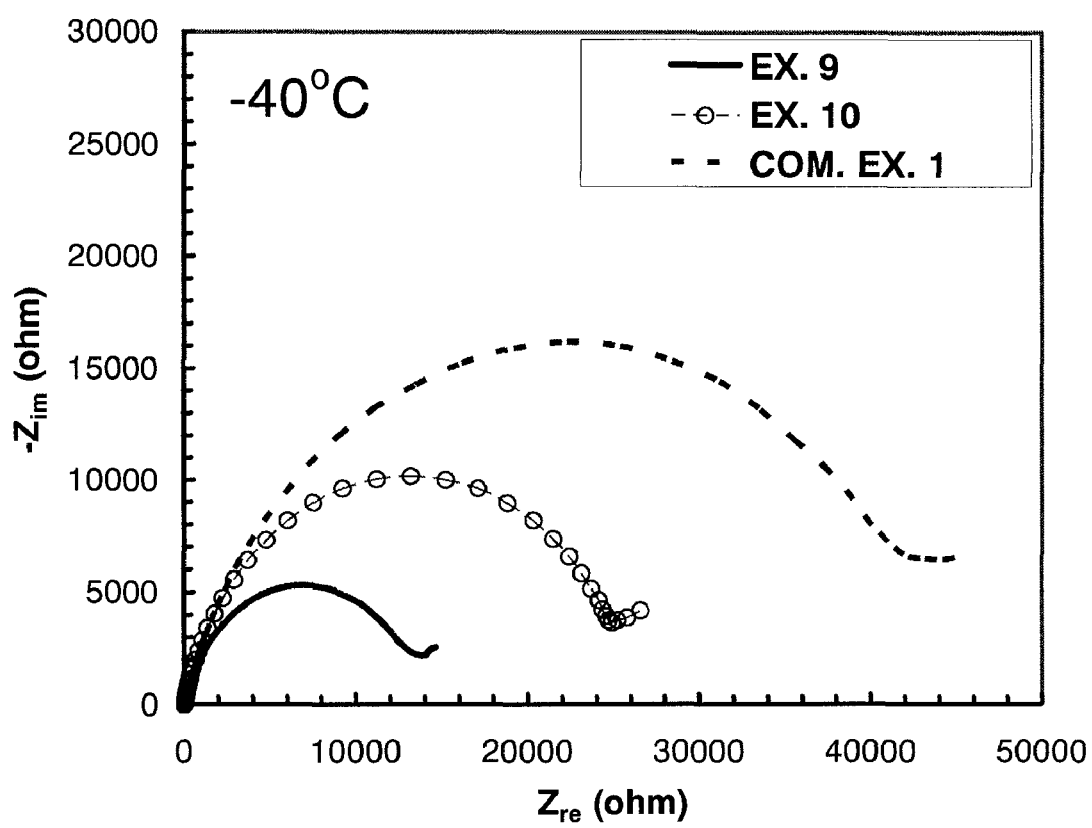
FIG. 3 is a graph describing Nyquist plots for the results of electrochemical impedance spectroscopy (EIS) measurement at −40° C. of lithium-ion MCMB anode half cells with electrolyte formulations described in EXAMPLES 9 and 10, and electrolyte described in COMPARATIVE EXAMPLE 1.

FIG. 3 shows Nyquist plots for the results of the above-described EIS experiments. The results indicate that the lithium-ion anode half cells with the electrolyte formulations of EXAMPLE 9 and 10 showed lower resistance at −40° C. than the cell with the electrolyte of COMP. EX. 1. The data show that $SO_2$ addition combined with nitriles suppresses the growth of interfacial impedance of the cells at −40° C.

Figure 4:
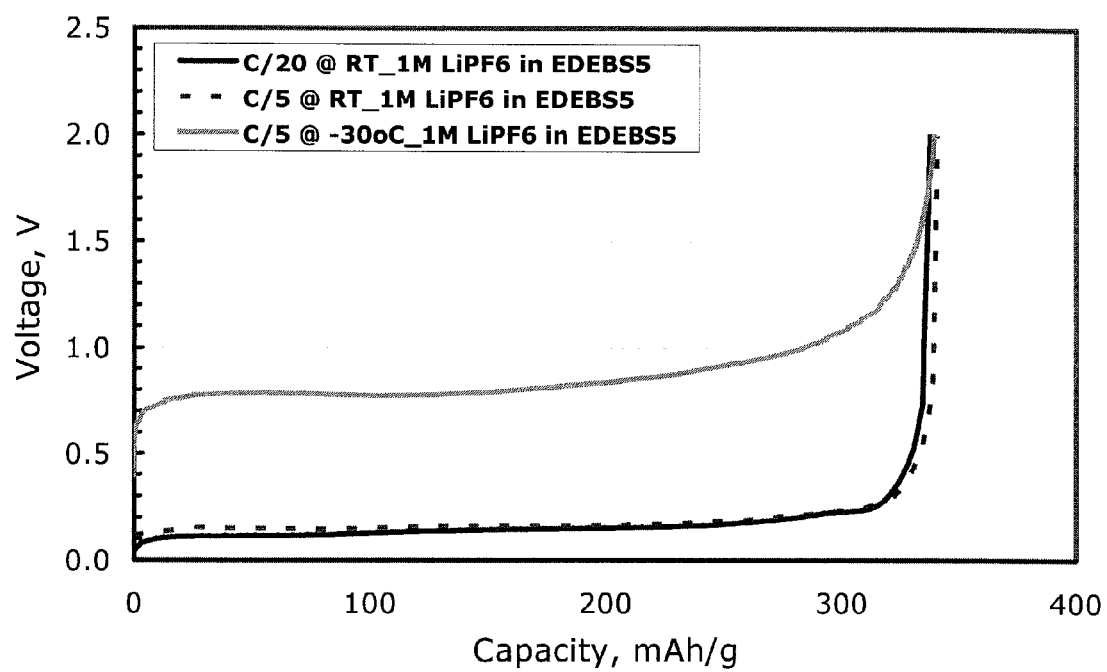
FIG. 4 is a graph showing discharge capacities of lithium-ion MCMB half cell with Example 10 electrolyte obtained from RT and −30° C.: hazed line=C/5 at −30° C., dotted line=C/5 at RT, and solid line=C/20 at RT.

The lithium-ion anode half cells with an electrolyte formulation of EXAMPLE 10 were placed for evaluation of rate capability at −30° C. FIG. 4 shows that the C/5 delithiation capacity for the lithium-ion MCMB anode half cell containing EXAMPLE 10 electrolyte is almost the same at −30° C. as at room temperature.

Examples 13-14 and Comparative Example 3

Isothermal-aging tests at 85° C. using an accelerating rate calorimeter (ARC) were performed to further investigate the high temperature stability nitrile based electrolyte formulations. The isothermal-aging experiment determines the degree of any exothermic reaction or gas evolution as a function of aging time. Time, sample temperature, and pressure data were collected simultaneously. For these tests, 2 grams of electrolyte sample were loaded in a 5.5 g titanium ARC test sphere (OD=1" sphere, 9 ml capacity) inside the glove box. The sample was transferred and loaded in the ARC under nitrogen environment. The sample was heated to 85° C. at 5° C./min, and then held at that temperature for 2900 minutes. At the end of test, the sample was cooled down to room temperature. Electrolyte formulations listed in TABLE 5 were tested.

TABLE 5

| | Amount (g) | Electrolyte formulation |
|---|---|---|
| EXAMPLE 13 | 2 | 1M $LiPF_6$ in BN (as described in EXAMPLE 4) |
| EXAMPLE 14 | 2 | 1M $LiPF_6$ in EDEBS5 (as described in EXAMPLE 10) |
| COMP. EX. 3 | 2 | 1M $LiPF_6$ in EDE (as described in COMP. EX. 1) |

Figure 5:
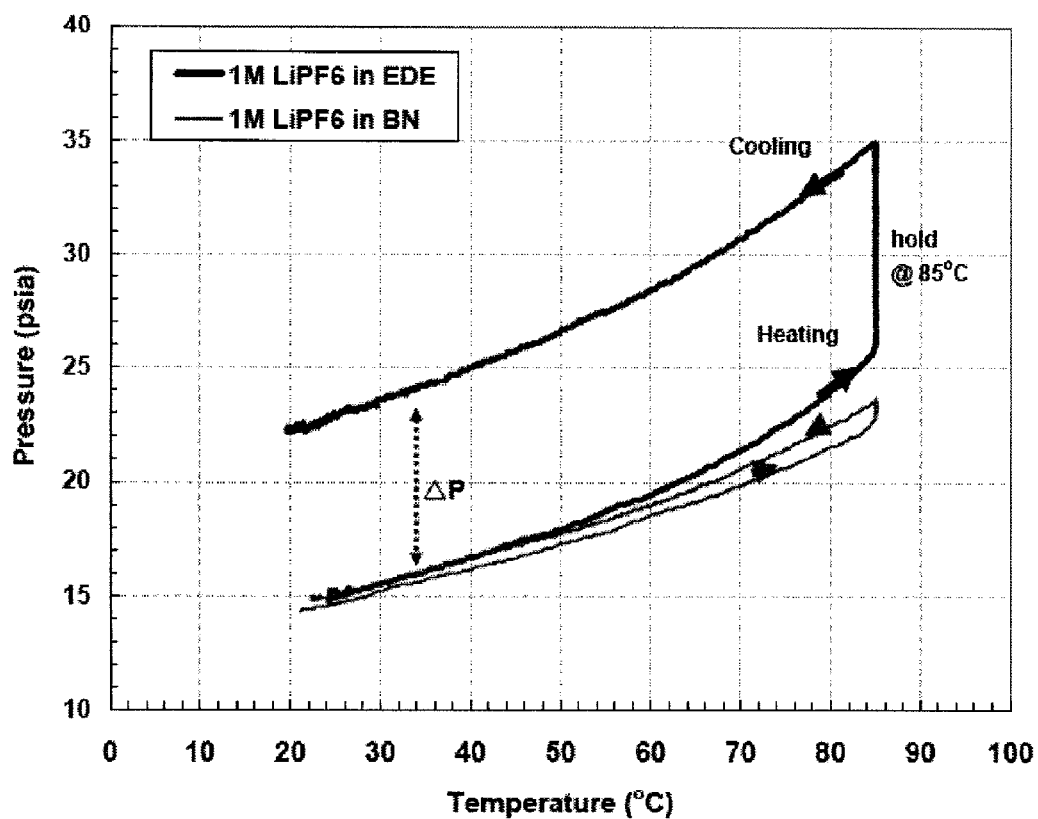
FIG. 5 is a graph describing pressure changes of Example 13 and COMPARATIVE EXAMPLE 3 as a function of temperature during an isothermal-aging test using an accelerating rate calorimeter (ARC) system.
Figure 6:
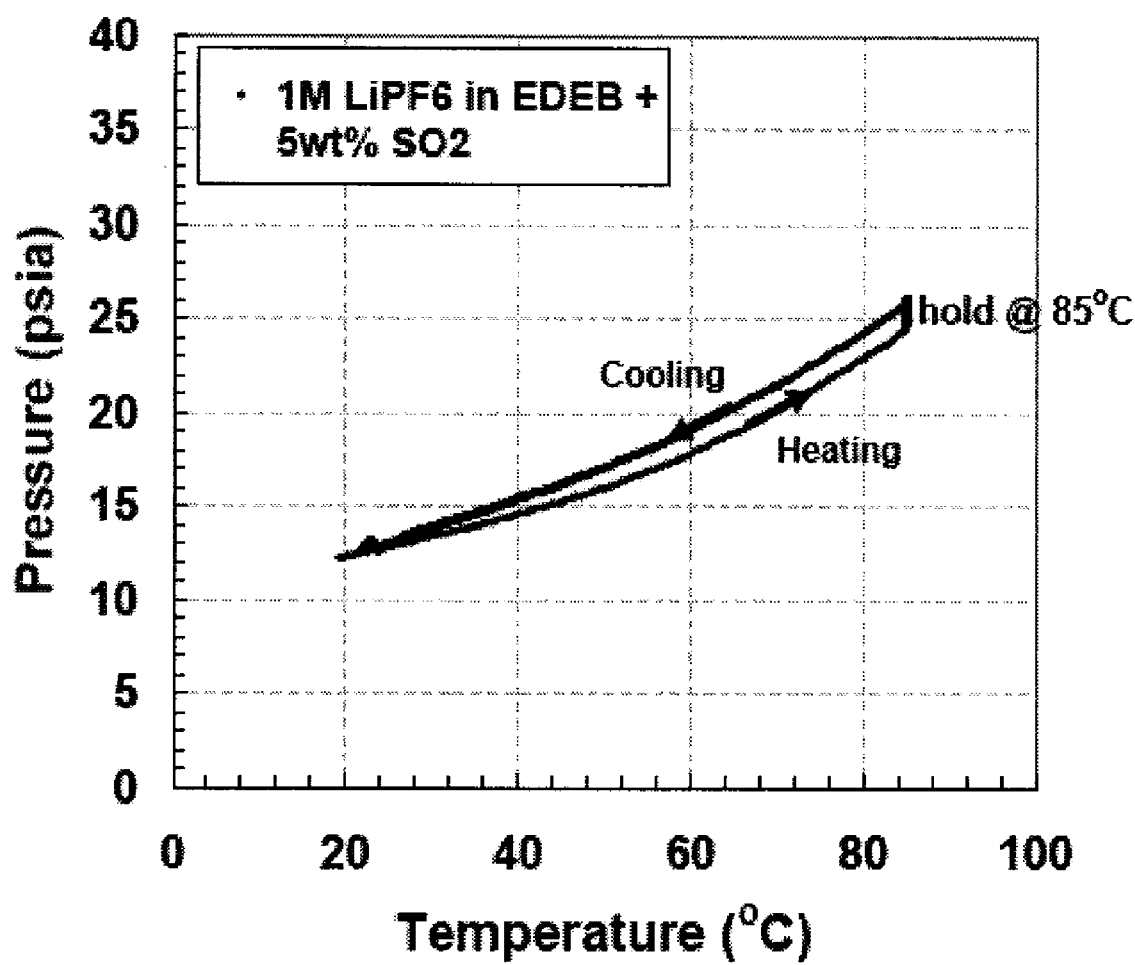
FIG. 6 is a graph describing pressure changes of Example 14 as a function of temperature during an isothermal-aging test using an ARC system.

FIG. 5 shows pressure changes for electrolyte formulations of EXAMPLE 13 and COMPARATIVE EXAMPLE 3 ("COMP. EX. 3") during the isothermal-aging test. FIG. 6 shows pressure changes for electrolyte formulations of EXAMPLE 14. COMP. EX. 3 showed a large pressure build-up over the course of the 2900 minute holding period at 85° C. and after cooling to room temperature, the pressure remained 7.9 psi higher than before heating began, showing that a significant amount of non-condensable gas was formed by the control electrolyte at high temperature. In contrast, EXAMPLES 13 and 14 showed very little non-condensable gas formation, giving further evidence for the capability of nitriles to suppress of the reactivity of $LiPF_6$-based electrolyte at high temperatures.

Other embodiments are within the scope of the following claims.

What is claimed is:

1. An electrochemical cell, comprising:
 a cathode that is capable of having an alkali metal reversibly inserted into and de-inserted from the cathode;
 an anode capable of reversibly releasing and receiving the alkali metal; and
 a non-aqueous electrolyte comprising
  one or more dissolved lithium salts,
  one or more nitriles,
  about 0.05 wt % to about 30 wt % sulfur dioxide, based on the total weight of the non-aqueous electrolyte, and
  one or more other polar aprotic solvents.

2. The cell of claim 1, wherein the concentration of the one or more dissolved lithium salts in the electrolyte is from about 0.3M to about 2.0M.

3. The cell of claim 1, wherein one or more dissolved lithium salts is selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlCl_4$, lithium bis(oxalato)borate (Li-BOB), halogenated LiBOB, a polyvalent anionic lithium salt, $Li_2B_{12}F_xH_{12-x}$, and mixtures thereof.

4. The cell of claim 1, wherein the concentration of the one or more nitriles is from about 5 vol % to about 80 vol %.

5. The cell of claim 1, wherein the one or more nitriles is selected from the group consisting of aliphatic nitriles, aromatic nitriles, alicyclic nitriles, acetonitrile, propionitrile, butyronitrile, valeronitrile, hexanenitrile and mixtures thereof.

6. The cell of claim 1, wherein the concentration of the one or more other polar aprotic solvents is from about 0 vol % to about 95 vol %.

7. The cell of claim 1, wherein the one or more other polar aprotic solvents is selected from the group consisting of carbonate, lactone, ether, ester, acetate, and mixtures thereof.

8. The cell of claim 7, wherein the carbonate is selected from the group consisting of ethylene carbonate, propylene carbonate, butylene carbonate, fluoroethylene carbonate, vinylene carbonate, dimethylvinylene carbonate, vinylethylene carbonate, dimethyl carbonate, ethyl methyl carbonate, diethyl carbonate, methyl propyl carbonate, dipropyl carbonate, methyl butyl carbonate, dibutyl carbonate and mixtures thereof.

9. The cell of claim 1, wherein the alkali metal comprises lithium.

10. The cell of claim 1, wherein the cathode comprises a material selected from the group consisting of $LiCoO_2$, $LiNiO_2$, $LiNi_xCo_yM_zO_2$, wherein M is one of metal element selected from the group consisting of Al, Mg, Ti, B, Ga and Si, and $0.0 \leq x, y, z \leq 1$ and $x+y+z=1$, $LiMn_{0.5}Ni_{0.5}O_2$, $LiNi_{1/3}Co_{1/3}Mn_{1/3}O_2$, $LiFePO_4$, $LiCoPO_4$, $LiMnPO_4$, $LiMn_2O_4$, vanadium oxide, and mixtures thereof.

11. The cell of claim 1, wherein the anode comprises a material selected from the group consisting of graphite, carbon, $Li_4Ti_5O_{12}$, tin alloys, silicon alloys, intermetallic compounds, lithium metal, and mixtures thereof.

12. A method, comprising:
 charging the electrochemical cell of claim 1 prior to an initial discharge;
 initially discharging the cell; and
 recharging the cell after initially discharging the cell.

13. A method, comprising:
 forming a non-aqueous electrolyte comprising
  one or more dissolved lithium salts,
  one or more nitriles,
  about 0.05 wt % to about 30 wt % sulfur dioxide, based on the total weight of the non-aqueous electrolyte, and
  one or more other polar aprotic solvents; and
 using the electrolyte to make an electrochemical cell.

14. The method of claim 13, wherein the concentration of the one or more dissolved lithium salts in the electrolyte is from about 0.3M to about 2.0M.

15. The method of claim 13, wherein one or more dissolved lithium salts is selected from the group consisting of $LiPF_6$, $LiBF_4$, $LiSbF_6$, $LiAsF_6$, $LiClO_4$, $LiCF_3SO_3$, $LiN(CF_3SO_2)_2$, LiN(C$_2$F$_5$SO$_2$)$_2$, LiAlCl$_4$, lithium bis(oxalato)borate (LiBOB), halogenated LiBOB, a polyvalent anionic lithium salt, Li$_2$B$_{12}$F$_x$H$_{12-x}$, and mixtures thereof.

16. The method of claim 13, wherein the concentration of the one or more nitriles is from about 5 vol % to about 80 vol %.

17. The method of claim 13, wherein the one or more nitriles is selected from the group consisting of aliphatic nitriles, aromatic nitriles, alicyclic nitriles, acetonitrile, propionitrile, butyronitrile, valeronitrile, hexanenitrile and mixtures thereof.

18. The method of claim 13, wherein the concentration of the one or more polar aprotic solvents is from about 0 vol % to about 95 vol %.

19. The method of claim 13, wherein the one or more other polar aprotic solvents is selected from the group consisting of carbonate, lactone, ether, ester, acetate, and mixtures thereof.

20. The method of claim 19, wherein the carbonate is selected from the group consisting of ethylene carbonate, propylene carbonate, butylene carbonate, fluoroethylene carbonate, vinylene carbonate, dimethylvinylene carbonate, vinylethylene carbonate, dimethyl carbonate, ethyl methyl carbonate, diethyl carbonate, methyl propyl carbonate, dipropyl carbonate, methyl butyl carbonate, dibutyl carbonate and mixtures thereof.

21. The method of claim 13, wherein the cell comprises lithium capable of being reversibly released from and received by an anode, and capable of being reversibly de-inserted from and inserted into a cathode.

22. The method of claim 13, wherein the cell comprises a cathode comprising a material selected from the group consisting of LiCoO$_2$, LiNiO$_2$, LiNi$_x$Co$_y$M$_z$O$_2$, wherein M is one of metal element selected from the group consisting of Al, Mg, Ti, B, Ga and Si, and $0.0 \leq x, y, z \leq 1$ and $x+y+z=1$, LiMn$_{0.5}$Ni$_{0.5}$O$_2$, LiNi$_{1/3}$Co$_{1/3}$Mn$_{1/3}$O$_2$, LiFePO$_4$, LiCoPO$_4$, LiMnPO$_4$, LiMn$_2$O$_4$, vanadium oxide, and mixtures thereof.

23. The method of claim 13, wherein the cell comprises an anode comprising a material selected from the group consisting of graphite, carbon, Li$_4$Ti$_5$O$_{12}$, tin alloys, silicon alloys, intermetallic compounds, lithium metal, and mixtures thereof.

24. An electrochemical cell, comprising:
a cathode that is capable of having an alkali metal reversibly inserted into and de-inserted from the cathode;
an anode capable of reversibly releasing and receiving the alkali metal; and
a non-aqueous electrolyte consisting essentially of
one or more dissolved lithium salts,
one or more nitriles, and
about 0.05 wt % to about 30 wt % sulfur dioxide, based on the total weight of the non-aqueous electrolyte.

25. The cell of claim 24, wherein the concentration of the one or more dissolved lithium salts in the electrolyte is from about 0.3M to about 2.0M.

26. The cell of claim 24, wherein one or more dissolved lithium salts is selected from the group consisting of LiPF$_6$, LiBF$_4$, LiSbF$_6$, LiAsF$_6$, LiClO$_4$, LiCF$_3$SO$_3$, LiN(CF$_3$SO$_2$)$_2$, LiN(C$_2$F$_5$SO$_2$)$_2$, LiAlCl$_4$, LiSO$_3$CF$_3$, lithium bis(oxalato)borate (LiBOB), halogenated LiBOB, a polyvalent anionic lithium salt, Li$_2$B$_{12}$F$_x$H$_{12-x}$, and mixtures thereof.

27. The cell of claim 24, wherein the concentration of the one or more nitriles is from about 30 vol % to about 99.5 vol %.

28. The cell of claim 24, wherein the one or more nitriles is selected from the group consisting of aliphatic nitriles, aromatic nitriles, alicyclic nitriles, acetonitrile, propionitrile, butyronitrile, valeronitrile, hexanenitrile and mixtures thereof.

29. The cell of claim 24, wherein the alkali metal comprises lithium.

30. The cell of claim 24, wherein the cathode comprises a material selected from the group consisting of LiCoO$_2$, LiNiO$_2$, LiNi$_x$Co$_y$M$_z$O$_2$, wherein M is one of metal element selected from the group consisting of Al, Mg, Ti, B, Ga and Si, and $0.0 \leq x, y, z \leq 1$ and $x+y+z=1$, LiMn$_{0.5}$Ni$_{0.5}$O$_2$, LiNi$_{1/3}$Co$_{1/3}$Mn$_{1/3}$O$_2$, LiFePO$_4$, LiCoPO$_4$, LiMnPO$_4$, LiMn$_2$O$_4$, vanadium oxide, and mixtures thereof.

31. The cell of claim 24, wherein the anode comprises a material selected from the group consisting of graphite, carbon, Li$_4$Ti$_5$O$_{12}$, tin alloys, silicon alloys, intermetallic compounds, lithium metal, and mixtures thereof.

32. The cell of claim 24, wherein the electrolyte is substantially free of other polar aprotic solvents.

33. A method, comprising:
charging the electrochemical cell of claim 24 prior to an initial discharge;
initially discharging the cell; and
recharging the cell after initially discharging the cell.

34. The cell of claim 1, wherein a concentration of the one or more nitriles in the non-aqueous electrolyte is at least about 5 vol %, based on the total volume of the non-aqueous electrolyte.

35. The method of claim 13, wherein a concentration of the one or more nitriles in the non-aqueous electrolyte is at least about 5 vol %, based on the total volume of the non-aqueous electrolyte.

36. The cell of claim 24, wherein a concentration of the one or more nitriles in the non-aqueous electrolyte is at least about 5 vol %, based on the total volume of the non-aqueous electrolyte.

37. The cell of claim 1, wherein a concentration of the one or more nitriles in the non-aqueous electrolyte is at least about 5 vol % to about 15 vol %, based on the total volume of the non-aqueous electrolyte.

38. The method of claim 13, wherein a concentration of the one or more nitriles in the non-aqueous electrolyte is at least about 5 vol % to about 15 vol %, based on the total volume of the non-aqueous electrolyte.

39. The cell of claim 24, wherein a concentration of the one or more nitriles in the non-aqueous electrolyte is at least about 5 vol % to about 15 vol % based on the total volume of the non-aqueous electrolyte.

* * * * *